(12) United States Patent
Azimi

(10) Patent No.: US 6,761,802 B2
(45) Date of Patent: Jul. 13, 2004

(54) TUNNEL FOR DISTILLATION OF FRESH WATER FROM OCEAN SALT WATER

(76) Inventor: Hossein Azimi, 4820 Cabello Ct. Permanent Resident A 28 501 309, Union City, CA (US) 94587

(*) Notice: Subject to any disclaimer, the term of this patent is extended or adjusted under 35 U.S.C. 154(b) by 0 days.

(21) Appl. No.: 09/960,444

(22) Filed: Sep. 24, 2001

(65) Prior Publication Data

US 2003/0057085 A1 Mar. 27, 2003

(51) Int. Cl.[7] ............................. B01D 3/10; C02F 1/14
(52) U.S. Cl. ..................... 202/205; 159/25.2; 159/28.6; 159/903; 159/DIG. 16; 202/175; 202/234; 203/11; 203/DIG. 1; 203/91
(58) Field of Search ................ 159/28.6, 903, 159/25.2, 33, DIG. 16, 42, 901; 202/160, 175, 205, 234, 265; 203/2, 10, 11, 91, DIG. 1

(56) References Cited

U.S. PATENT DOCUMENTS

| | | | | |
|---|---|---|---|---|
| 3,163,587 A | * | 12/1964 | Champe | ..................... 202/176 |
| 3,288,685 A | * | 11/1966 | Kemper et al. | ................ 203/11 |
| 3,342,703 A | * | 9/1967 | Leach | ............................ 203/4 |
| 3,992,246 A | | 11/1976 | Welch | |
| 4,118,283 A | | 10/1978 | Diggs | |
| 4,135,985 A | | 1/1979 | La Rocca | |
| 4,154,657 A | * | 5/1979 | Dennen | ....................... 202/234 |
| 4,211,609 A | | 7/1980 | Diggs | |
| 4,235,678 A | | 11/1980 | McKeen | |
| 4,267,021 A | | 5/1981 | Speros et al. | |
| 4,270,981 A | * | 6/1981 | Stark | ......................... 202/172 |
| 4,329,204 A | * | 5/1982 | Petrek et al. | .............. 159/17.1 |
| 4,363,703 A | | 12/1982 | ElDifrawi et al. | |
| 4,444,623 A | | 4/1984 | Youngner | |
| 4,525,242 A | | 6/1985 | Iida | |
| 4,563,248 A | | 1/1986 | Anderson | |
| 4,584,061 A | * | 4/1986 | Shelton | ................... 202/185.6 |
| 4,606,794 A | | 8/1986 | Wyckoff | |
| 4,749,447 A | * | 6/1988 | Lew | ........................... 202/177 |
| 5,053,110 A | | 10/1991 | Deutsch | |
| 5,064,505 A | | 11/1991 | Borgren | |
| 5,067,272 A | | 11/1991 | Constantz | |
| 5,158,650 A | | 10/1992 | Wilkerson | |
| 5,198,076 A | | 3/1993 | Borgren | |
| 5,409,578 A | | 4/1995 | Kaneko | |
| 5,650,050 A | | 7/1997 | Kaufmann | |
| 5,672,250 A | | 9/1997 | Ambadar et al. | |
| 5,840,159 A | | 11/1998 | Rosenblad | |
| 6,274,004 B1 | * | 8/2001 | Andersen | ..................... 202/234 |
| 6,342,127 B1 | * | 1/2002 | Possidento | .................. 202/234 |
| 6,391,162 B1 | * | 5/2002 | Kamiya et al. | ............. 126/569 |

* cited by examiner

*Primary Examiner*—Virginia Manoharan
(74) *Attorney, Agent, or Firm*—Keith Frantz

(57) ABSTRACT

A closed tunnel system for distilling fresh water from ocean salt water is provided with an elongated evaporation plate adapted to hold ocean water for evaporation therefrom. During the distillation process, a vacuum is drawn in the tunnel, and sunlight is focused onto the evaporation plate with a concave lens-structure roof. External concave mirrors automatically track the sun and focus additional sunlight onto the lens-structure roof. An agitator-wiper unit agitates the ocean water on the evaporation plate to maintain a homogeneous liquid mixture, and to present additional water surface area for evaporation of fresh water. The fresh water vapor then condenses under pressure in heat exchangers that simultaneously pre-heat the ocean water prior to entry onto the evaporation plate.

25 Claims, 8 Drawing Sheets

TUNNEL FOR DISTILLATION OF FRESH WATER FROM OCEAN SALT WATER

CROSS-REFERENCES TO RELATED APPLICATIONS

None.

BACKGROUND OF THE INVENTION

1. Field of Invention

The present invention relates generally apparatus for the extraction of fresh water from ocean salt water.

More particularly, the invention relates to a distillation tunnel system that utilizes a combination of vacuum pressure, solar energy, mechanical spreading and agitation apparatus, an evaporation plate, and heat exchangers for the efficient distillation of fresh water from salt water.

2. Description of Prior Art

It is well established that there is a need for desalination of ocean water to produce fresh water. Such desalination is particularly desirable in geographic locations where the supply of fresh water is limited or dwindling, but where ocean water is readily available. Efficient desalination will provide for a continuing supply of potable water in such locations. The use of solar energy to power the distillation process is particularly suitable in geographic regions such as desert climates where large areas of land are readily available for use in the collection of solar energy.

There are numerous known techniques and many known apparatus utilizing these techniques for the desalination of salt water. Briefly, these desalination techniques include various forms of evaporation, distillation, reverse osmosis, freeze crystallization, ionic separation, and electrodialysis. The variety of proposed arrangements for these various techniques is evidence alone to the many difficulties associated with achieving efficient desalination, and a survey of the prior art and/or technical literature identifies the extensive problems associated with prior desalination apparatus. However, the primary difficulties that must be overcome for the efficient production of fresh water include the efficient use of power in a reliable, large-scale desalination process, and removal of the large quantity of particulate waste that remains after desalination.

Thus, there is an ever present need for improved apparatus adapted for desalination of salt water. In particular, there is a need for improved apparatus capable of achieving high rates of fresh water production, with improved efficiency to reduce the energy requirements associated therewith, and that is capable of disposing of the waste resulting therefrom.

SUMMARY OF THE INVENTION

The general aim of the present invention is to provide new and improved apparatus for the distillation and extraction of fresh water from ocean salt water by evaporation of fresh-water vapor and condensation into liquid.

A detailed objective is to achieve the foregoing by providing a closed tunnel system that includes an evaporation plate adapted to hold ocean water for evaporation of fresh water vapor therefrom, and a lens-structure roof adapted to focus sunlight onto the evaporation plate for warming the ocean water, and in which a vacuum is drawn to reduce the vaporization pressure therein.

Another detailed objective of the invention is to provide concave mirrors adapted to automatically track the sun and focus additional sunlight onto the lens-structure roof to assist in warming the ocean water and evaporation of fresh water vapor therefrom.

Yet another objective of the invention is to provide heat exchangers operative to simultaneously condense the fresh water vapor into liquid water, and pre-heat the ocean water prior to entry onto the evaporation plate.

The invention also resides in a novel agitator-wiper unit and arrangement that is adapted for spreading and agitating the ocean water on the evaporation plate to further enhance the evaporation rate of fresh-water vapor, and for removing salt and other particulate from the evaporation plate in conjunction with a conveyor system during cleaning and maintenance operations.

These and other objectives and advantages of the invention will become more apparent from the following detailed description when taken in conjunction with the accompanying drawings.

Figure 1:
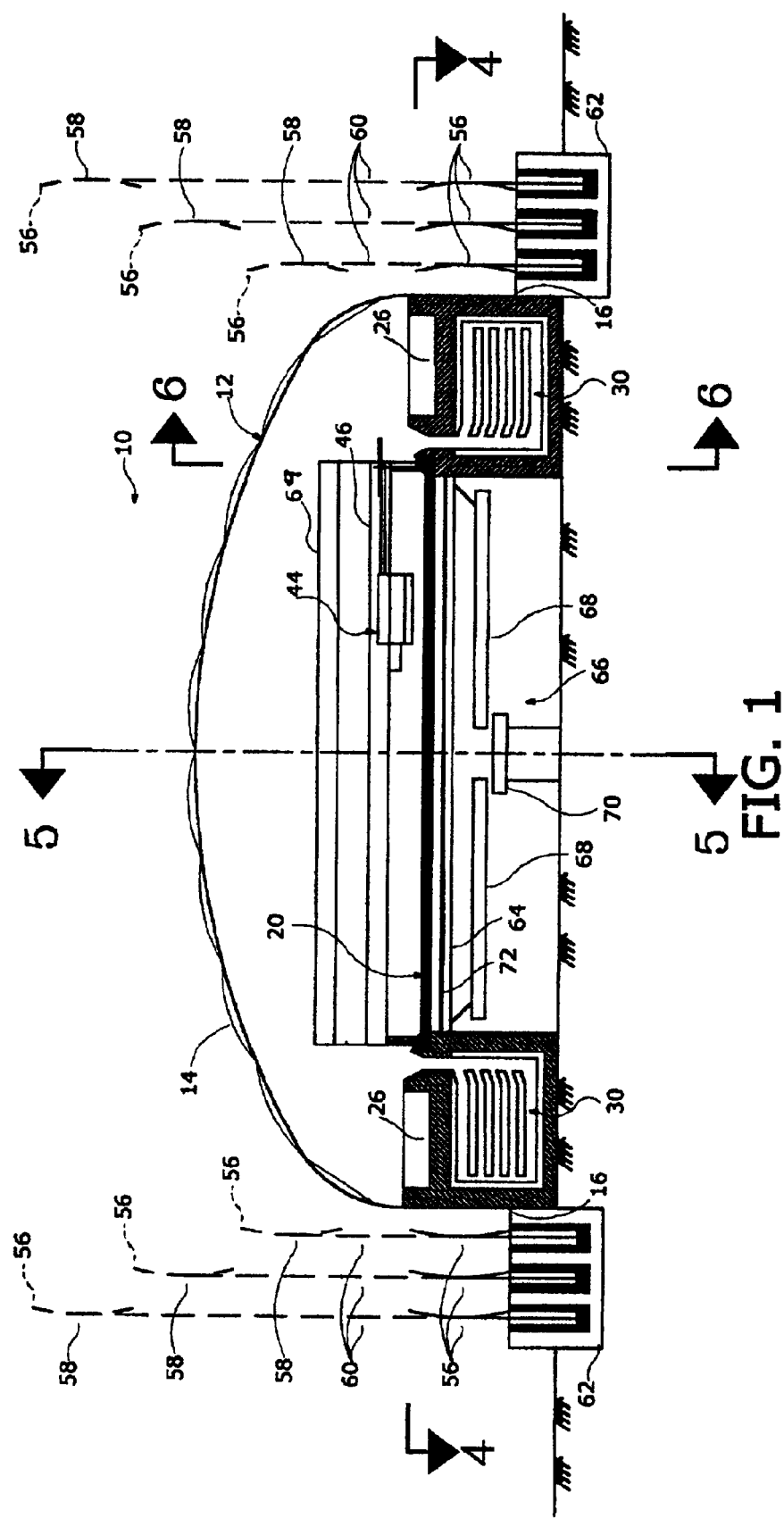
FIG. 1 is a front view of a new and improved distillation tunnel system incorporating the unique aspects of the present invention.

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in a system 10 (FIG. 1) adapted to distill fresh water from ocean water, by evaporation of fresh-water vapor from the salt water and condensing the vapor into liquid.

Figure 2:
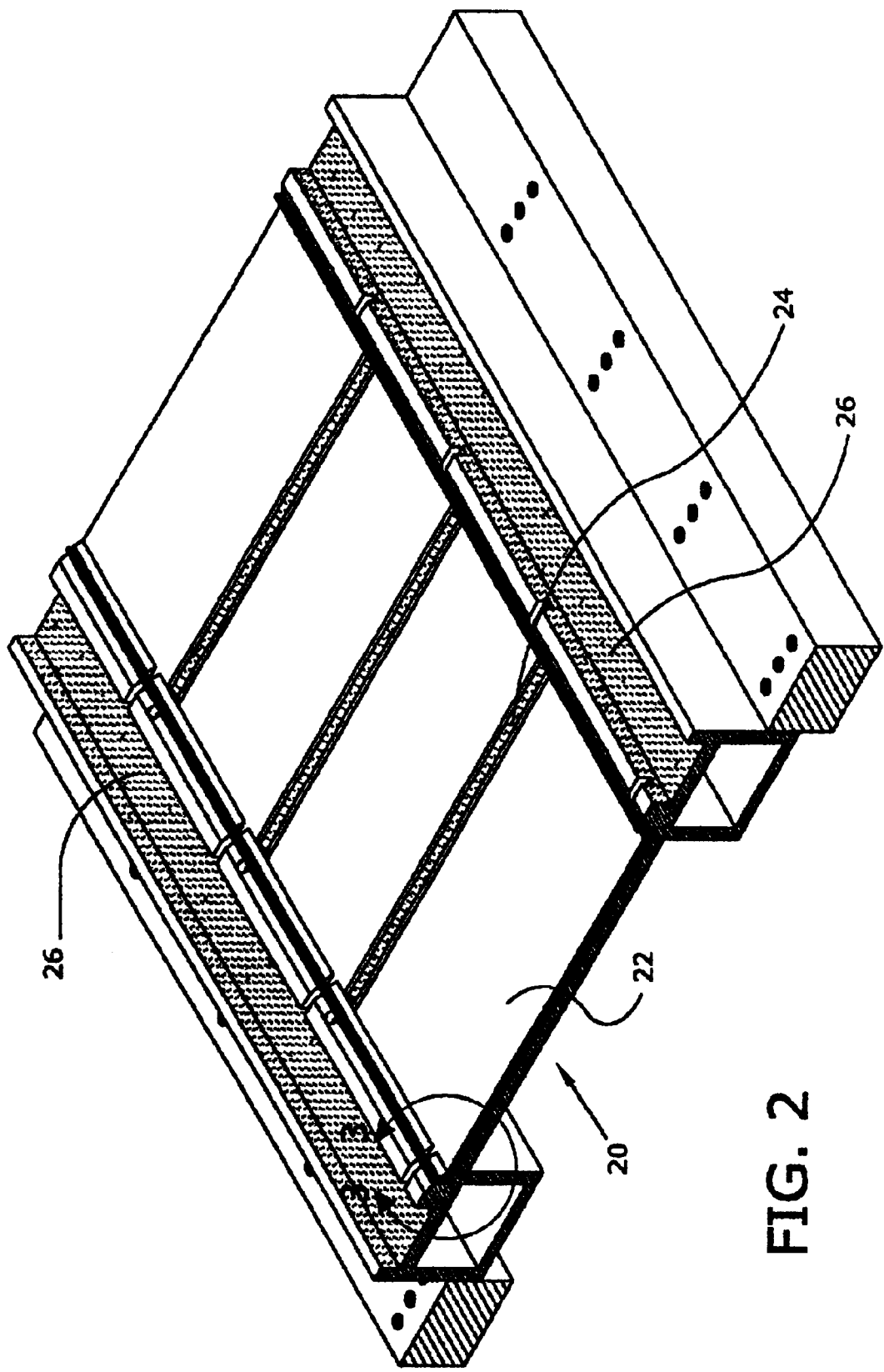
FIG. 2 is a fragmentary top perspective view of certain parts shown in FIG. 1.
Figure 3:
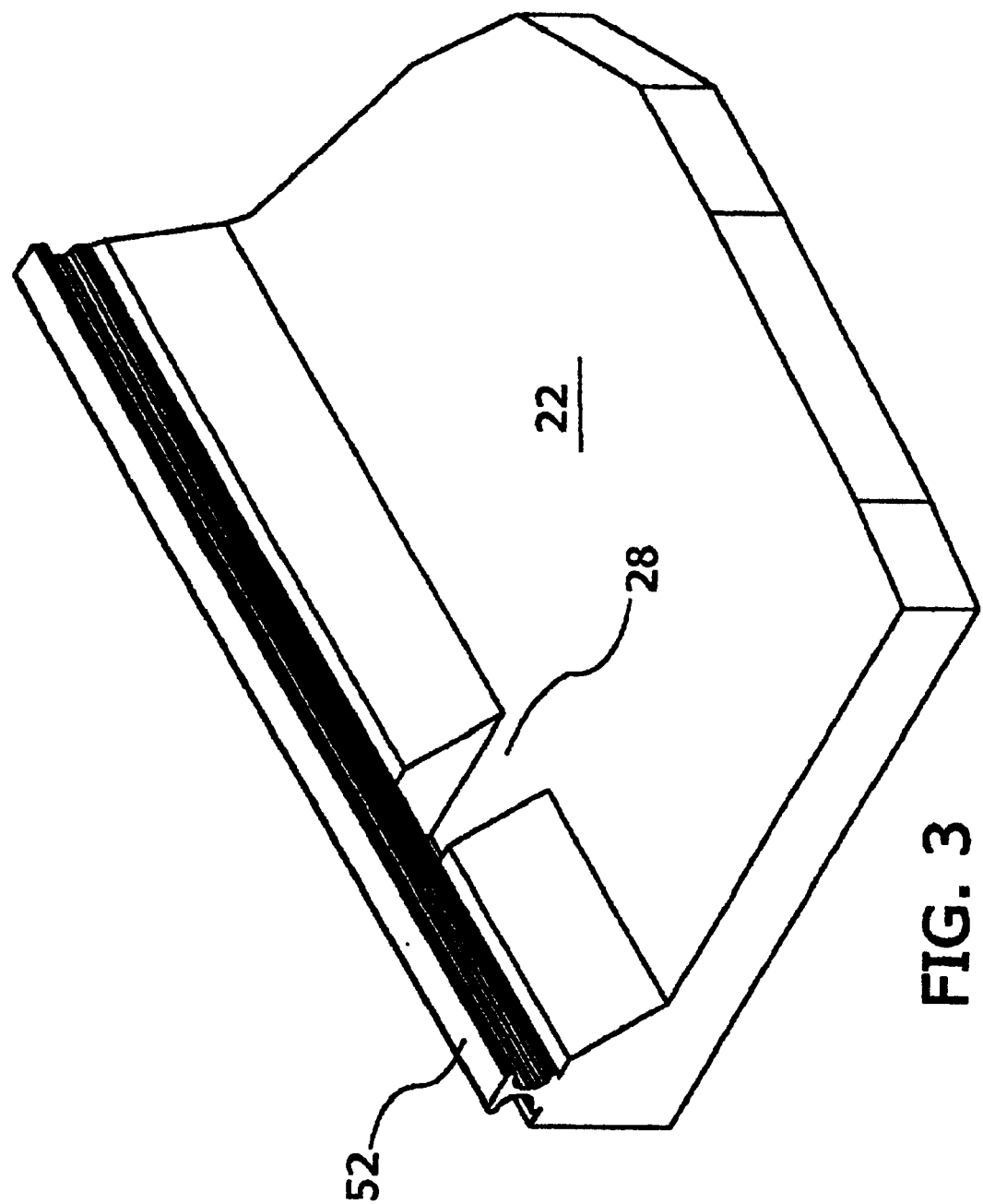
FIG. 3 is an enlarged fragmentary view taken substantially along the line 3—3 of FIG. 4.

Briefly, the distillation system 10 is a generally closed system that is substantially housed in a relatively long tunnel 12 positioned in view of direct sunlight. The roof of the tunnel is formed with concave lenses 14 secured to a support structure such as a grid-framework or a concave transparent structural membrane supported by sides 16, or otherwise constructed, or connected and secured together to cooperatively define an elongated, concave roof lens-structure that is operative to focus sunlight impinging thereon onto an evaporation plate 20. The evaporation plate is generally in the form of a relatively shallow, elongated pan extending along the length of the tunnel, and is adapted to hold ocean water for evaporation of fresh-water vapor therefrom. For cleaning purposes discussed further below, the evaporation plate comprises longitudinally alternating plate portions 22 (see FIG. 2) and hydraulically actuated doors 24 that are maintained closed during the distillation process. Extending along each side of the evaporation plate are channels 26 that receive ocean water and supply the water to the evaporation plate through inclined passageways 28 (see FIGS. 2 and 3). These supply channels and passageways assist in evenly distributing the ocean water along the length of the evaporation plate, such as compared with pumping ocean water directly onto the plate.

Concave mirrors 56 located outside the tunnel 12 are mounted at 58 to telescopic posts 60 for vertical movement as indicated with dashed lines in FIG. 1, and for pivoting and rotation at connection 58 to provide full three-dimensional positioning capability. The telescopic posts are secured in foundations 62 on each side of the tunnel. Control means (not shown) adjust the height and angular position of the mirrors to automatically track the sun and focus the redirected sun light onto the lenses 14 of the tunnel roof, thus augmenting the solar energy that is focused onto the evaporation plate.

Agitator-wiper units 44 are mounted above the evaporation plate 20 for movement vertically, laterally, and longitudinally with respect to the plate. In the embodiment shown, each agitator-wiper unit is mounted to a transverse rail or track shown in the form of an I-beam 46 on a pair of rollers 48 (FIG. 8) that are rotatably carried in a carriage-frame 45 for lateral movement (as indicated by arrow A—A in FIG. 7) across the plate; the beam 46 is supported on a pair of adjustable hydraulic jacks 51 that are operative to effect vertical movement (as indicated by arrow B—B); and the hydraulic jacks 51 are mounted to a frame 69 that is carried on laterally spaced, longitudinally extending tracks 52 via pairs of rollers 54 and associated electric drive motor 55 for longitudinal movement (as indicated by arrow C—C in FIG. 5) along the plate. Suitable electric and hydraulic power and control units (not shown) are provided to effect the desired timed movement control of the agitator-wiper unit.

Each agitator-wiper unit 44 also includes a relatively stiff wiper 47 fixed to the frame 45, and a rotary agitator 49 connected to the frame with an adjustable hydraulic jack 50 for vertical positioning capability (as indicated by arrow D—D in FIG. 8) of the agitator independently of the wiper. The agitator is configured to effect substantial agitation of the ocean water in the evaporation plate. In the embodiment shown, the agitator includes circumferentially spaced platelets 32 (FIG. 8) that extend from a rotatable circular/ring member with a radial component in the direction of rotation such that the platelets lift the water as they rotate therethrough.

Heat exchangers 30 (FIG. 1) are provided to (a) cool fresh-water vapor into liquid, and (b) pre-heat the ocean water prior to reaching the evaporation plate 20. To that end, each heat exchanger includes two fluid-flow circuits (a) that are fluidically isolated but in thermal-transfer contact with one another, and (b) for purposes discussed below, that each have one inlet and two exits. In the embodiment shown, to provide for a compact system, the heat exchangers are located below the supply channels 26.

Figure 4:
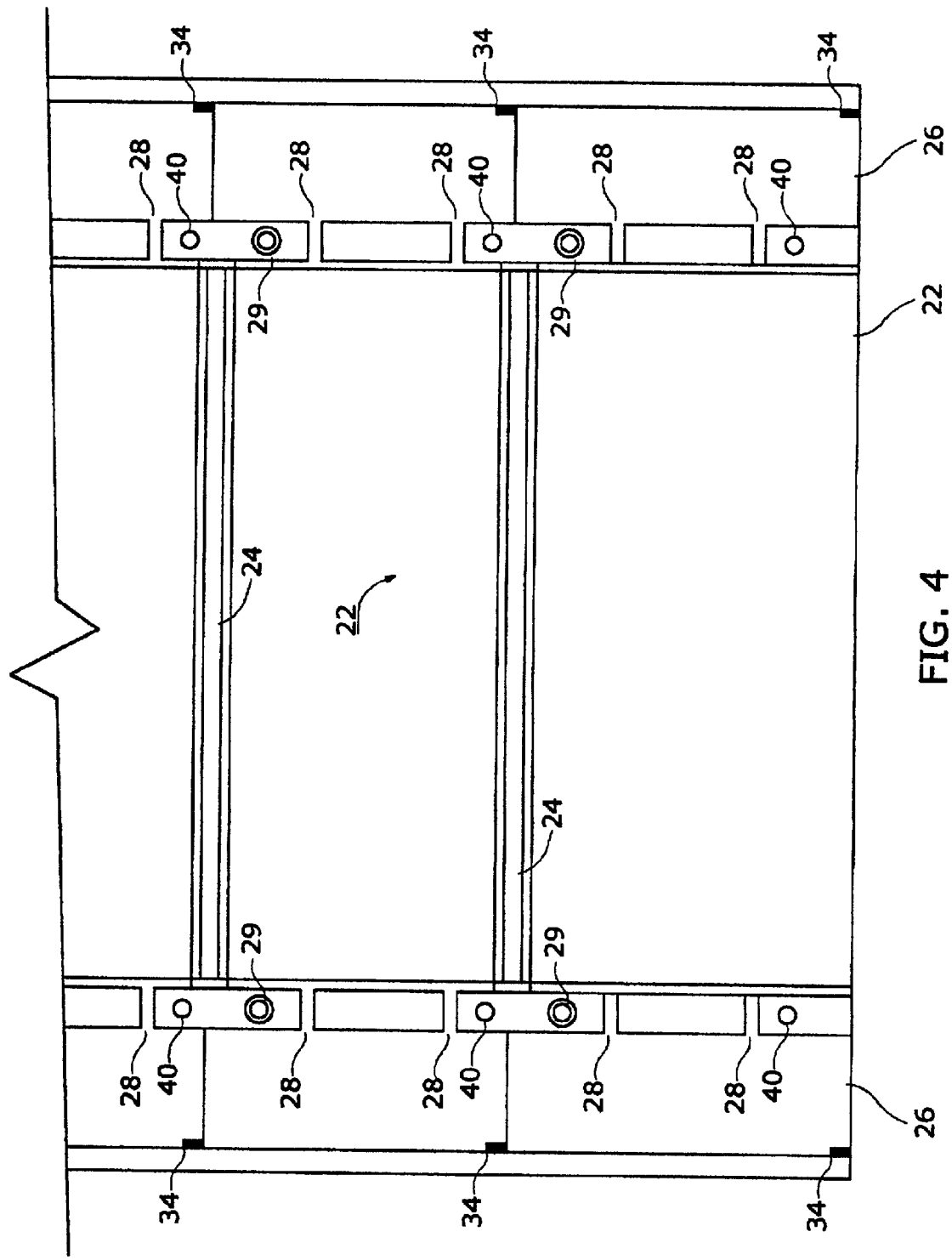
FIGS. 4, 5 and 6 are fragmentary views taken along the lines 4—4, 5—5 and 6—6, respectively, of FIG. 1.

Distillation of fresh water, by evaporation of fresh-water vapor from ocean water on the evaporation plate 20 and condensation of the fresh-water vapor into liquid water, proceeds in a continuous process. Initially, the tunnel 12 is sealed, and ocean water pumped into the supply channels 26 flows through passages 28 (FIG. 3) and fills the evaporation plate. The large plate results in presentation of a large surface area of water for evaporation of fresh-water vapor. Solar energy focused onto the evaporation plate, through the concave lenses 14, and resulting from direct sunlight and additional sunlight redirected by the mirrors 56 onto the roof, warms the ocean water to further assist in evaporation of fresh-water vapor from the ocean water. To still further enhance the evaporation rate, a vacuum is drawn in the tunnel by vacuum pumps 29 (FIG. 4). Preferably, the pressure is reduced to a level which permits vaporization with a relatively low temperature rise, such as with the water reaching a temperature of approximately 120 degrees Fahrenheit.

Figure 7:
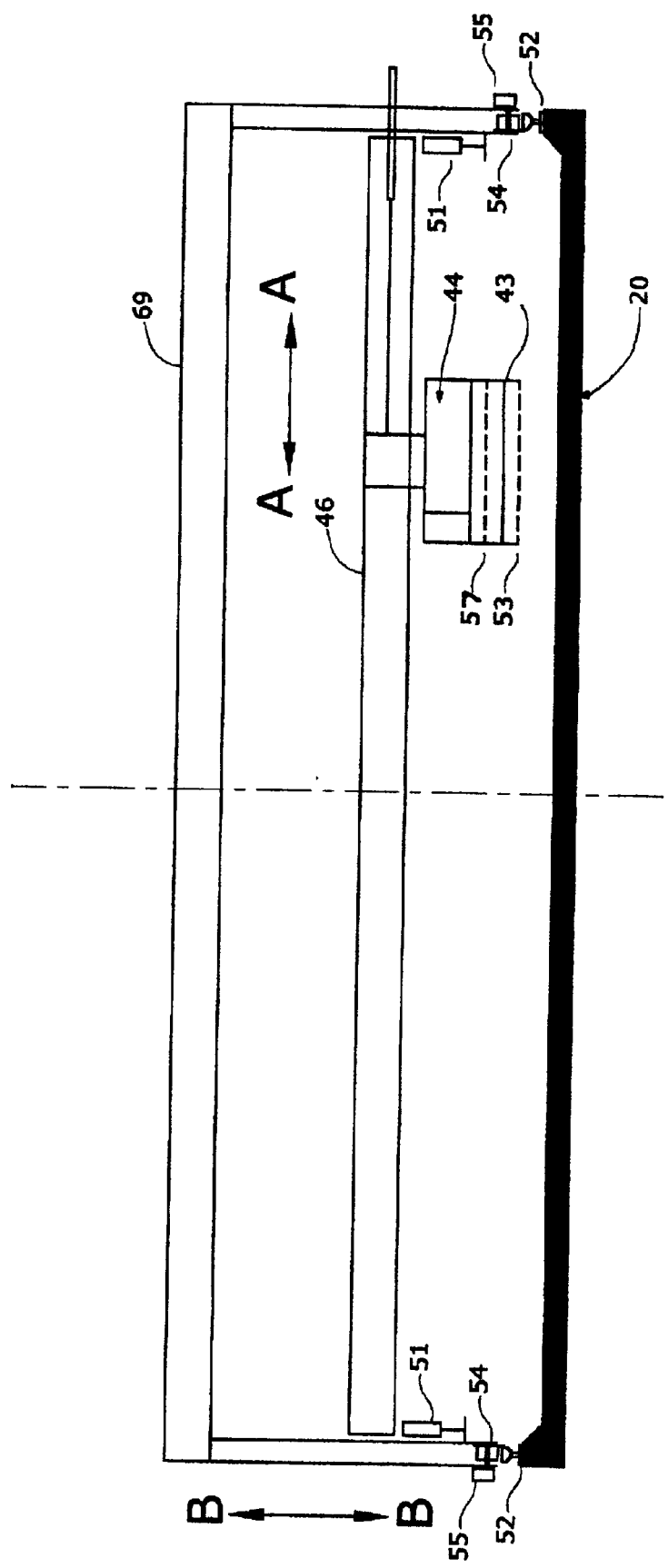
FIG. 7 is an enlarged front view of the agitator-wiper unit and mounting arrangement shown in FIG. 1.
Figure 8:
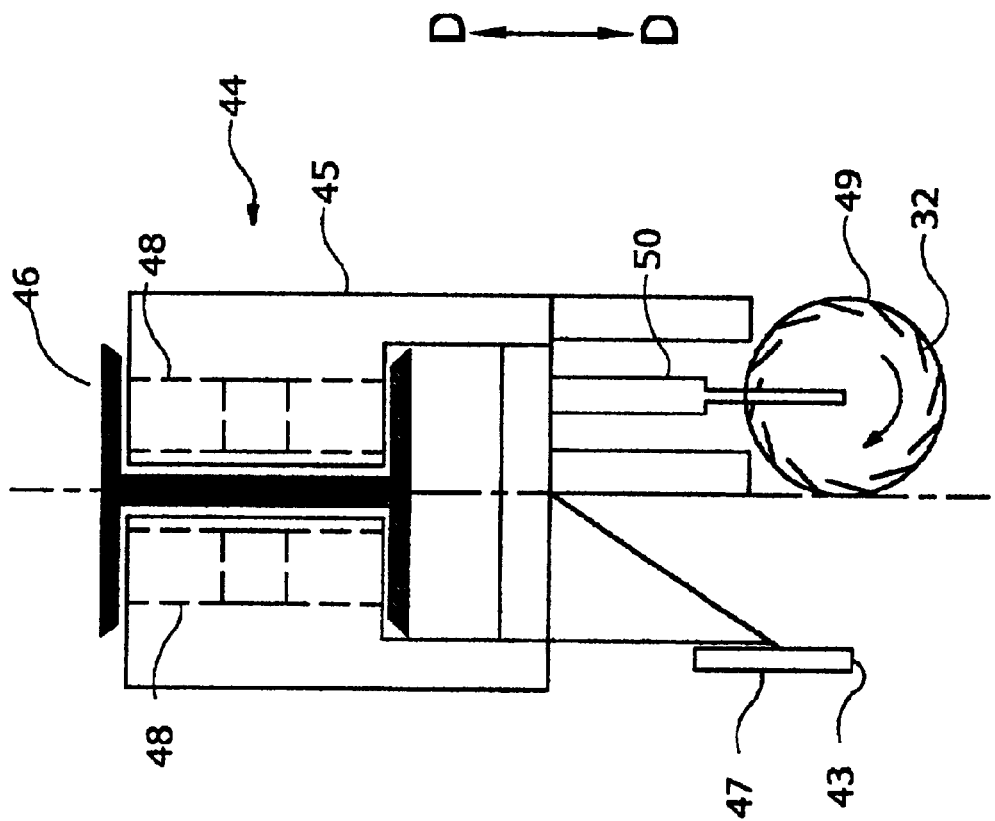
FIG. 8 is an enlarged side view of the agitator-wiper unit.

During the evaporation process, each agitator 49 (FIG. 8) is lowered with the associated hydraulic jacks 50, to a position extending below the associated wiper 47 such as indicated by dashed lines 53 in FIG. 7, and the entire agitator-wiper units 44, including the associated transverse beams 46, are lowered with hydraulic jacks 51 to position the agitator partially immersed in the ocean water on the evaporation plate 20. In this immersed position, the agitators are power rotated such as with an electric motor (not shown) as indicated by the arrow in FIG. 8, and continuously translated laterally, back and forth along the beams 46 (i.e., in direction A—A indicated in FIG. 7), and longitudinally on the tracks 52 (i.e., in direction C—C indicated in FIG. 5), to continuously sweep through the water and across each associated plate portion 22 of the evaporation plate 20 to agitate and provide for movement of the salt water on the plate. As a result, the platelets 32 continuously churning and lift the water to break-up the water and develop a relatively fine mist. Thus, the agitators provide yet additional enhancement of the evaporation rate by ensuring a homogenous mixture at the surface of the water as water evaporates therefrom, and establishing yet additional water surface area on which evaporation can occur.

As a result of these processes, water evaporates from the ocean water on the evaporation plate 20 at a relatively high rate, and the tunnel 12 fills with fresh-water vapor. The fresh-water vapor is drawn from the tunnel by the vacuum pumps 29 into the first fluid-flow circuits in the heat exchangers 30 for cooling and condensation into distilled liquid. Cooling of the fresh-water vapor is accomplished by heat transfer with cooling ocean water pumped through the second fluid-flow circuits in the heat exchangers.

Figure 6:
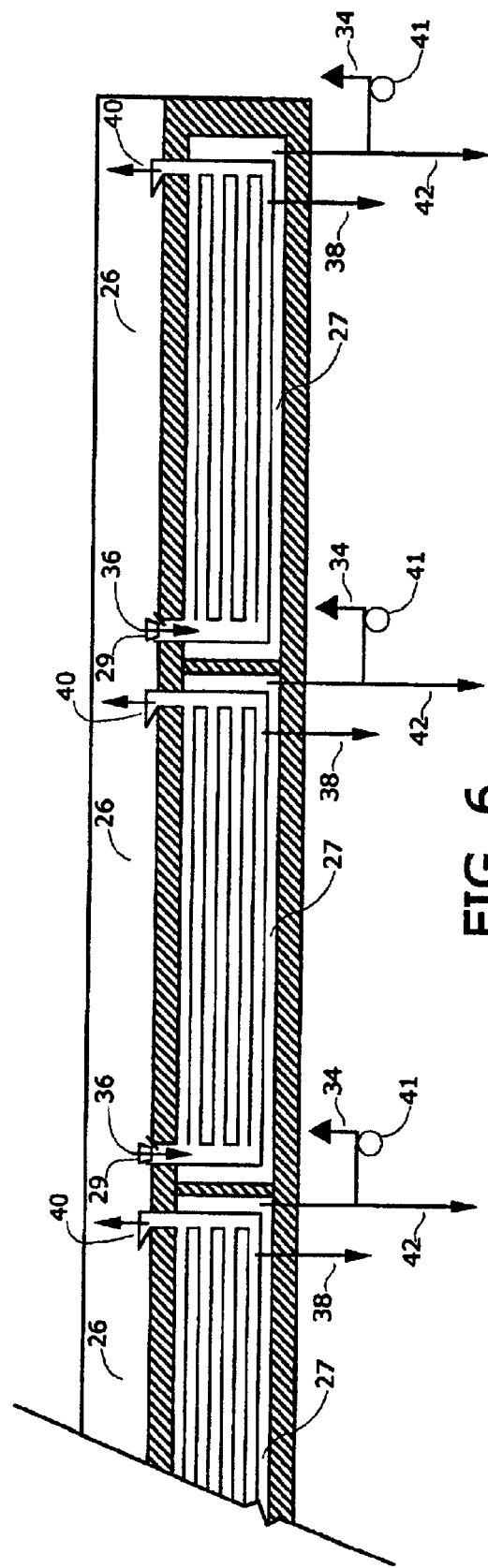

As illustrated schematically in FIG. 6, the fresh-water vapor enters the heat exchangers 30 as indicated at 36, and ocean water is pumped into the heat exchanger as indicated at 27. As the vapor flows through the heat exchanger, it is cooled by the ocean water resulting in condensation into fresh water. During this continuous process, the vacuum pumps 29 develop a positive pressure in the heat exchanges to further assist in condensation of the vapor, the pressure level in the heat exchanger being regulated by exit valves as indicated at 40. The distilled fresh water condensate flows out the heat exchangers at lower exits as indicated at 38 and into collection reservoirs (not shown). Fresh-water vapor that does not condense out is pumped back into the tunnel 12 through the upper exit valves 40. During this process, heat from the water vapor transfers to and warms the ocean water in the second fluid-flow circuit. This warmed ocean water is split into two exit flows from the heat exchangers 30. A portion of the warmed ocean water is diverted from the return and pumped to the supply channels 26 through an exit as indicated at 34 via pump 41. Advantageously, the raised temperature of this water reduces the additional heating that must occur on the evaporation plate 20 for subsequent vaporization. The excess flow of warmed ocean water is returned to the sea via a second exit as indicated at 42.

In order to maintain distillation during the night time, and on days when insufficient sunlight is available, an auxiliary heat source such as a gas fired burner 64 with an associated heat exchanger 72 is provided under the evaporation plate 20 to raise the temperature of the ocean water for evaporation purposes. Potential alternate auxiliary heat sources include an electric heater under or embedded in the evaporation plate.

Figure 5:
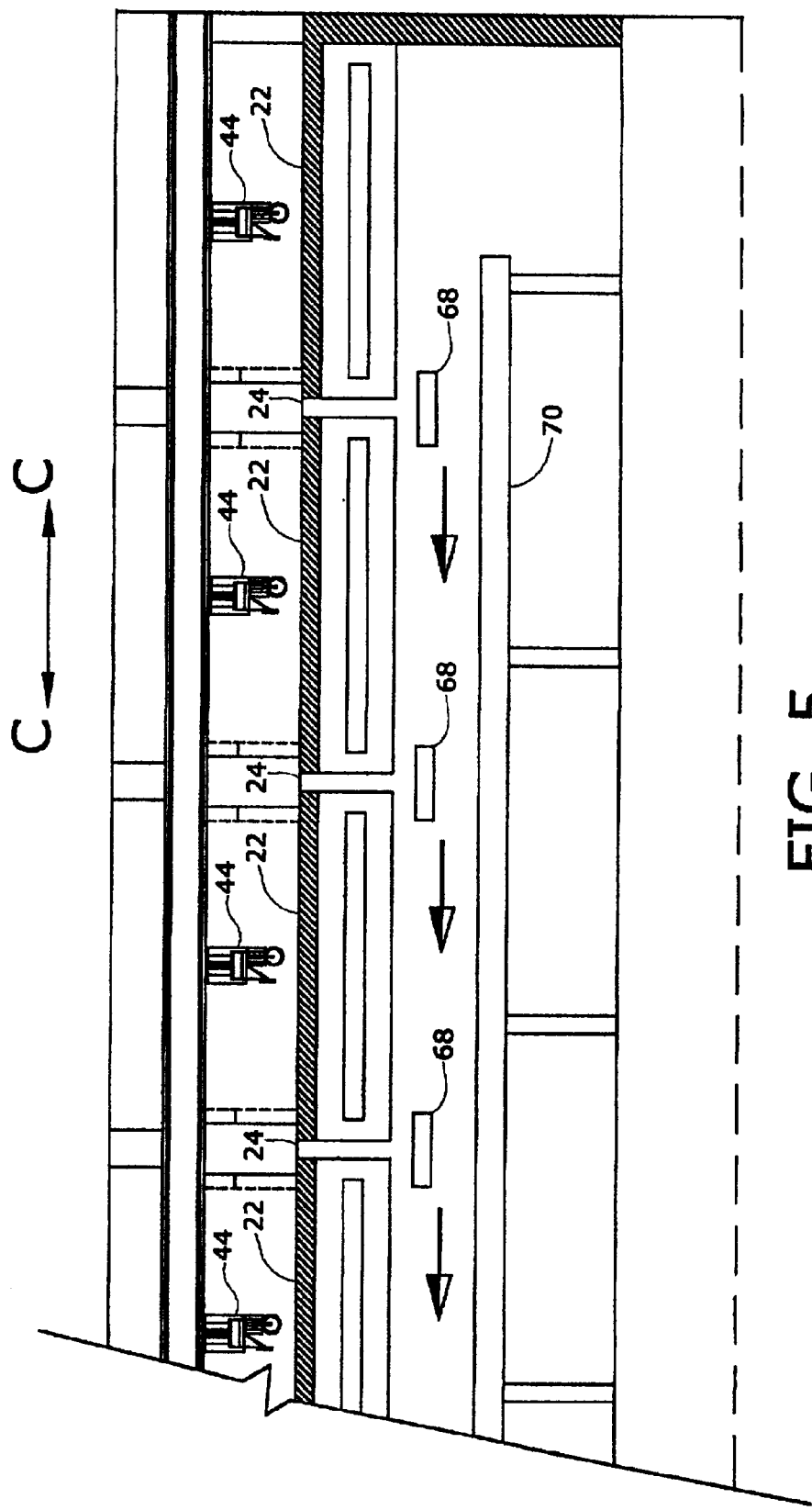

After operation for a period of time, salt, minerals and other particulate residue build up on the evaporation plate 20. To clean the evaporation plate, the agitators 49 of the agitator-wiper units 44 are raised such as indicated with lines D—D in FIG. 8 to a level as indicated by dashed lines 57 in FIG. 7, and the units are lowered until the lower edges 43 of the wipers 47 slidably engaging the evaporation plate 20. The units then sweep laterally and longitudinally across the plate portions 22 to clean the salt and mineral deposits therefrom, moving the particulate and brine accumulated on the plate to the transverse doors 24 (FIG. 5). With the doors actuated open, the waste drops therethrough onto a power-driven a conveyor system 66 under the evaporation plate 20 for transporting particulate out of the tunnel 12. In the embodiment shown, the conveyor system includes lateral-moving conveyors 68 which extend under the doors and which transport the particulate to a central longitudinal-moving conveyor 70 which then carries the particulate to a collection bin (not shown). At the completion of the cleaning, the doors 24 are closed, a vacuum is re-established in the tunnel, and the evaporation process reinitiates as described above.

For convenience of building distillation systems of different lengths, the distillation tunnel system 10 is preferably constructed in a substantially modular manner. In the embodiment shown, the system comprises repeating operative sections that are generally associated with each plate portion 22 and door 24 of the evaporation plate 20. With this arrangement, a heat exchanger 30, a set of mirrors 56, a set of roof lenses 14, and an agitator-wiper unit 44 are associated with each plate portion and door.

From the forgoing, it is clear the present invention brings to the art a new and improved distillation system adapted for producing fresh water from ocean water. By virtue of providing a closed distillation tunnel system adapted to present a large surface area for evaporation, simultaneously warm the ocean water with solar energy, reduce the atmospheric pressure surrounding the water and continuously agitate the water, the system is uniquely adapted for evaporation of fresh water vapor at a relatively high rate. By pre-heating the water with the fresh water vapor during condensation thereof, the system recovers and recycles a portion of the energy therein for subsequent evaporation. Thus, the system 10 is able to achieve higher continuous rates of production of fresh water from ocean water, with a reduced need for external energy supply, as compared with prior distillation systems. Moreover, the unique plate construction, wiper units and conveyor system provide for ease of removing and disposing of the waste product resulting from the evaporation process.

I claim:

1. A system for distillation of fresh water from a supply of salt water, the system comprising:
   a closed tunnel;
   an evaporation plate located in the tunnel to hold salt water for evaporation of fresh-water vapor therefrom;
   the tunnel having a roof configured to focus solar energy onto the evaporation plate and warm the salt water thereon;
   a rotary agitator positionable proximate the plate and operative to agitate the salt water thereon as it rotates;
   a vacuum pump having (i) an inlet communicating with the closed tunnel to draw a low-pressure environment in the tunnel and to draw fresh-water vapor therefrom, and (ii) an outlet through which the fresh-water vapor exits;
   a heat exchanger provided with first and second fluid-flow circuits,
   the first circuit having (i) an inlet communicating with the outlet of the vacuum pump to receive the fresh-water vapor therefrom, (ii) a first outlet for discharge of condensed fresh water, and (iii) a second outlet communicating with the tunnel for return of un-condensed fresh water vapor to the tunnel,
   the second circuit having (i) an inlet communicating with the supply of salt water, and (ii) an outlet communicating with the evaporation plate to supply warmed salt water thereto; and
   a pressure control valve operative between the tunnel and the second outlet of the first fluid-flow circuit to control the pressure, therein.

2. The distillation system of claim 1 further comprising mirrors operative to focus additional sunlight through the roof of the tunnel.

3. The distillation system of claim 1 in which the evaporation plate comprises alternating stationary plate portions and doors that are movable between open and closed positions, the system further comprising a wiper movable to clear sediment from the plate portions through the doors when opened, and a conveyor positioned below the doors for receiving and conveying the sediment from the tunnel.

4. The distillation system of claim 1 further comprising a supply channel extending along the evaporation plate, the supply channel establishing, at least in part, said communication between the outlet of the second circuit and the evaporation plate.

5. The distillation system of claim 1 in which the evaporation plate comprises alternating stationary plate portions and doors that are movable between open and closed positions, and a wiper movable to clear sediment from the plate portions through the doors when opened, the agitator and wiper being vertically positionable independently of one another for operation independently thereof.

6. A system for distillation of fresh water from a supply of salt water, the system comprising:
   a closed tunnel;
   an evaporation plate located in the tunnel and comprising alternating stationary plate portions and doors that are movable between open and closed positions to hold a supply of salt water for evaporation of fresh-water vapor therefrom when the doors are closed;
   the tunnel having a roof configured to focus solar energy onto the evaporation plate and warm the salt water thereon;
   a vacuum pump having (i) an inlet communicating with the closed tunnel to draw a low-pressure environment in the tunnel and to draw fresh-water vapor therefrom, and (ii) an outlet, through which the fresh-water vapor exits;
   a heat exchanger provided with first and second fluid-flow circuits,
   the first circuit having (i) an inlet communicating with the outlet of the vacuum pump to receive the fresh-water vapor therefrom, (ii) a first outlet for discharge of condensed fresh water, and (iii) a second outlet communicating with the tunnel for return of un-condensed fresh water vapor to the tunnel, the second circuit having (i) an inlet communicating with the supply of salt water, and (ii) an outlet communicating with the evaporation plate to supply warmed salt water thereto;

a wiper movable to clear sediment from the plate portions through the doors when opened; and a conveyor positioned below the doors for receiving and conveying the sediment from the tunnel.

7. The distillation system of claim 6 further comprising mirrors operative to focus additional sunlight through the roof of the tunnel.

8. The distillation system of claim 6 further comprising a supply channel extending along the evaporation plate, the supply channel establishing, at least in part, said communication between the outlet of the second circuit and the evaporation plate.

9. The distillation system of claim 6 further comprising a rotary agitator positionable proximate the evaporation plate for agitating the salt water thereon.

10. The distillation system of claim 9 in which the agitator and wiper are vertically positionable independently of one another for operation independently thereof.

11. A system for distillation of fresh water from a supply of salt water, the system comprising:

a closed tunnel;

an evaporation plate located in the tunnel to hold salt water for evaporation of fresh-water vapor therefrom;

the tunnel having a roof configured to focus solar energy onto the evaporation plate and warm salt water thereon;

a vacuum pump having (i) an inlet communicating with the closed tunnel to draw a low-pressure environment in the tunnel and to draw fresh-water vapor therefrom, and (ii) an outlet through which the fresh-water vapor exits under pressure;

a heat exchanger provided with first and second fluid-flow circuits, the first circuit having (i) an inlet communicating with the outlet of the vacuum pump to receive the fresh-water vapor therefrom, (ii) a first outlet for discharge of condensed fresh water, and (iii) a second outlet communicating with the tunnel for return of un-condensed fresh water vapor to the tunnel, the second circuit having (i) an inlet communicating with the supply of salt water, and (ii) an outlet communicating with the evaporation plate to supply warmed salt water thereto; and an agitator-wiper unit for spreading and agitating that salt water on the evaporation plate.

12. The distillation system of claim 11 further comprising mirrors operative to focus additional sunlight through the roof of the tunnel.

13. The distillation system of claim 11 further comprising a supply channel extending along the evaporation plate, the supply channel establishing, at least in part, said communication between the outlet of the second circuit and the evaporation plate.

14. The distillation system of claim 11 in which the agitator includes platelets extending with a radial component in the direction of rotation for lifting water in a direction away from the evaporation plate.

15. The distillation system of claim 14 in which the evaporation plate comprises alternating stationary plate portions and doors that are movable between open and closed positions, the system further comprising a wiper movable to clear sediment from the plate portions through the doors when opened, and a conveyor positioned below the doors for receiving and conveying the sediment from the tunnel.

16. The distillation system of claim 15 in which the agitator and wiper are vertically positionable independently of one another for operation independently thereof.

17. A system for distillation of fresh water from a supply of salt water, the system comprising:

a closed tunnel;

an evaporation plate located in the tunnel, the plate being configured to hold salt water for evaporation of fresh-water vapor therefrom;

the tunnel having a roof with lenses configured to focus solar energy onto the evaporation plate and warm salt water thereon;

a rotary agitator movable over the evaporation plate and operative to lift salt water upwardly as it rotates to agitate the salt water thereon;

an auxiliary heat source located under the plate to optionally assist in raisins the temperature of the salt water on the plate;

a supply channel extending along the evaporation plate, the supply channel having (i) an inlet communicating with the supply salt water, and (ii) an outlet communicating with the evaporation plate to supply salt water thereto;

a vacuum pump having (i) an inlet communicating with the closed tunnel to draw a low-pressure environment in the tunnel and to draw fresh-water vapor therefrom, and (ii) an outlet through which the fresh-water vapor exits under pressure; and a heat exchanger provided with first and second fluid-flow circuits, the first circuit having (i) an inlet communicating with the outlet of the vacuum pump to receive the fresh-water vapor therefrom, (ii) a first outlet for discharge of condensed fresh water, and (iii) a second outlet communicating with the tunnel for return of un-condensed fresh water vapor to the tunnel, the second circuit having (i) an inlet communicating with the supply of salt water, and (ii) an outlet communicating with the supply channel to supply warmed salt water thereto.

18. The distillation system of claim 17 further comprising mirrors operative to focus additional sunlight through the roof of the tunnel.

19. The distillation system of claim 17 in which the evaporation plate comprises alternating stationary plate portions and doors that are movable between open and closed positions, the system further comprising a wiper movable to clear sediment from the plate portions through the doors when opened, a conveyor positioned below the doors for receiving and conveying the sediment from the tunnel, and a rotary agitator positionable proximate the evaporation plate for agitating the salt water thereon.

20. The distillation system of claim 19 in which the agitator includes platelets extending with a radial component in the direction of rotation for lifting water in a direction away from the evaporation plate.

21. The distillation system of claim 19 in which the agitator and wiper are vertically positionable independently of one another for operation independently thereof.

22. A system for distillation of fresh water from a supply of salt water, the system comprising:

a closed tunnel;

an evaporation plate located in the tunnel and comprising alternating stationary plate portions and doors that are movable between open and closed positions to hold a supply of salt water for evaporation of fresh-water vapor therefrom when the doors are closed;

a rotary agitator positionable proximate the evaporation plate for agitating the salt water thereon;

a supply channel extending along the evaporation plate, the supply channel having (i) an inlet communicating with the supply salt water, and (ii) an outlet communicating with the evaporation plate to supply salt water thereto;

the tunnel having a roof configured to focus solar energy onto the evaporation plate and warm salt water thereon;

a vacuum pump having (i) an inlet communicating with the closed tunnel to draw a low-pressure environment in the tunnel and to draw fresh-water vapor therefrom, and (ii) an outlet through which the fresh-water vapor exits;

a heat exchanger provided with first and second fluid-flow circuits, the first circuit having (i) an inlet communicating with the outlet of the vacuum pump to receive the fresh-water vapor therefrom, (ii) a first outlet for discharge of condensed fresh water, and (iii) a second outlet communicating with the tunnel for return of un-condensed fresh water vapor to the tunnel, the second circuit having (i) an inlet communicating with the supply of salt water, and (ii) an outlet communicating with the supply channel to supply warmed salt water thereto;

a pressure control valve connected between the tunnel and the first fluid-flow circuit of the heat exchanger to control the pressure therein;

a wiper movable to clear sediment from the plate portions through the doors when opened; and a conveyor positioned below the doors for receiving and conveying the sediment from the tunnel.

23. The distillation system of claim 22 further comprising mirrors operative to focus additional sunlight through the roof of the tunnel.

24. The distillation system of claim 22 in which the agitator includes platelets extending with a radial component in the direction of rotation for lifting water in a direction away from the evaporation plate.

25. The distillation system of claim 22 in which the agitator and wiper are vertically positionable independently of one another for operation independently thereof.

* * * * *